UNITED STATES PATENT OFFICE.

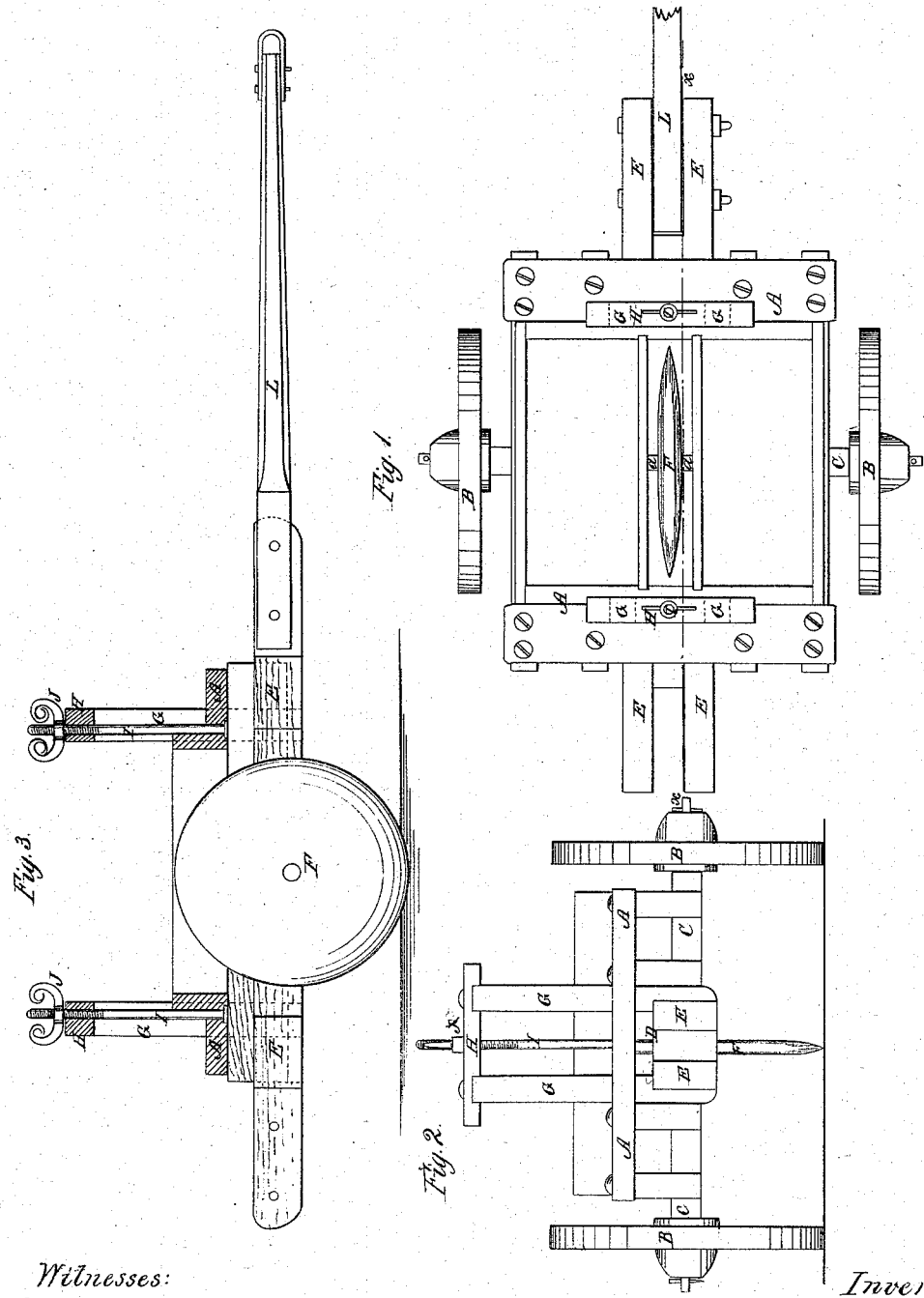

JACOB P. REES AND R. A. GRAHAM, OF GREENSBURG, INDIANA, ASSIGNORS TO THEMSELVES AND C. C. BURNS, OF SAME PLACE.

IMPROVED DITCHING-MACHINE.

Specification forming part of Letters Patent No. 54,823, dated May 15, 1866.

*To all whom it may concern:*

Be it known that we, JACOB P. REES and ROBERT A. GRAHAM, of Greensburg, in the county of Decatur and State of Indiana, have invented new and useful Improvements in Ditching-Machines; and we do hereby declare that the following is a full, clear, and exact description thereof, which will enable others skilled in the art to make and use the same, reference being had to the accompanying drawings, forming a part of this specification.

The object of this invention is to construct or arrange the ditching device of the machine in such a manner that by drawing the machine over the portion of the ground which is to be ditched either one or more times a ditch of any desired depth may be made; and the invention also consists, still further, in so constructing the machine that the body can be raised above the frame in which the ditching wheel or device is arranged, so that if the body be then loaded in any suitable and convenient mode the ditching-wheel can be thus forced into the ground to any desired depth, pressing the dirt out upon each side.

In accompanying plate of drawings our improvements are illustrated, Figure 1 being a plan or top view of the machine; Fig. 2, a vertical section taken in the plane of the line $x\ x$, Fig. 1; and Fig. 3 an elevation of the rear end of the machine.

Similar letters of reference indicate like parts.

A in the drawings represents the body of the machine, supported upon two wheels, B B, one upon each side of the same, turning upon short axles C thereof, in the same line with each other, but only extending partially across the under side of the body.

D is a frame formed by two parallel bars or beams, E E, placed a short distance apart and secured together near each end, having between the two points of its length, where joined together, a wheel, F, which is the ditching device, hung by its center trunnion-pins, $a\ a$, upon each side, so as to freely turn.

This ditching-wheel is made thin at its edge or periphery, gradually increasing in thickness toward its center or axis, as plainly shown in the drawings, and the frame in which it is hung is placed under the body of the machine, extending in the direction of its length, with the parallel uprights G passing up through the body A at or near each end, with a cross-piece, H, over the upper ends of the same. Through each of these cross-pieces H H loosely passes a vertical screw-shaft, I, secured at their lower ends in the body of the machine, with a thumb-screw nut, J, upon their upper ends, by turning which nuts in the proper directions, either to the right or left, as the case may be, the said ditching-wheel frame will be either raised or lowered, as the case may be, as is obvious without further explanation.

L is a pole, secured at one end to the slotted end of the wheel-frame, to which pole the horses which are to draw the machine are harnessed in any proper manner.

From the above description it is plain to be seen that if the boxes M M of the body of the machine be loaded in any suitable and convenient manner and the thumb-screw nuts J J turned in the proper direction to raise the machine-body, the wheel can be made to penetrate the ground in which it is desired to form a ditch to any required depth within the limits of the machine, the ditching-wheel turning around as the machine is drawn over the ground and pressing the dirt to each side of the same.

We claim as new and desire to secure by Letters Patent—

The ditching-wheel F, or its equivalent, arranged in a suitable frame so hung in and to the body of the machine as to be raised or lowered, substantially in the manner described, and for the purpose specified.

JACOB P. REES.
R. A. GRAHAM.

Witnesses:
J. S. SCOBEY,
GENORG HAMILTON,